United States Patent [19]

Malven et al.

[11] Patent Number: 5,070,830
[45] Date of Patent: Dec. 10, 1991

[54] POWERTRAIN AND STIFFENING BRACKET THEREFOR

[75] Inventors: David F. Malven, Lake Orion; Richard P. Andersen, Howell; Charles R. Baker, Pontiac, all of Mich.

[73] Assignee: Saturn Corporation, Troy, Mich.

[21] Appl. No.: 554,002

[22] Filed: Jul. 17, 1990

[51] Int. Cl.⁵ .............................. F16M 1/02; F02F 7/00
[52] U.S. Cl. .............................. 123/195 A; 123/198 E
[58] Field of Search .......... 123/195 A, 195 C, 195 S, 123/195 R, 195 H, 198 E

[56] References Cited

U.S. PATENT DOCUMENTS

| | | | |
|---|---|---|---|
| 3,207,142 | 9/1965 | Gorissen et al. | 123/195 R |
| 4,245,595 | 1/1981 | Abe et al. | 123/198 E |
| 4,458,640 | 7/1984 | Shimada | 123/195 H |
| 4,467,754 | 8/1984 | Hayashi et al. | 123/195 H |
| 4,509,475 | 4/1985 | Visek | 123/195 A |
| 4,831,978 | 5/1989 | Iguchi et al. | 123/195 H |

Primary Examiner—David A. Okonsky
Attorney, Agent, or Firm—Robert J. Outland

[57] ABSTRACT

A powertrain including an engine and attached power transmission means has a stiffening bracket extending between the side walls of the engine block and the transmission means housing. The bracket extends under and separate from the engine oil pan and has integral ribs depending from a floor and extending longitudinally and diagonally from the power transmission connections to each of the side wall connections to add both bending and torsional stiffness to the powertrain, thus reducing vibration, noise and stress.

8 Claims, 1 Drawing Sheet

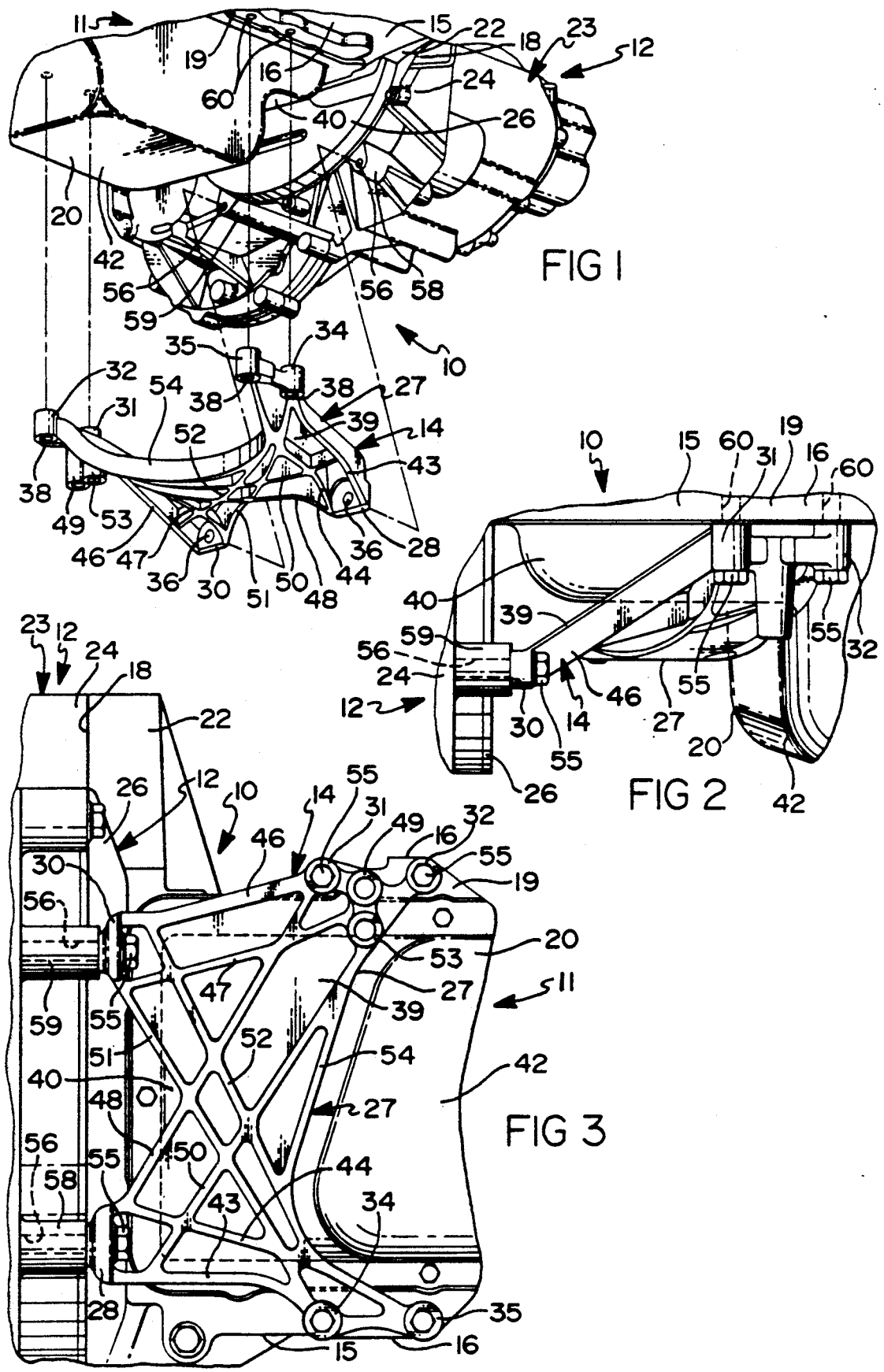

POWERTRAIN AND STIFFENING BRACKET THEREFOR

FIELD OF THE INVENTION

This invention relates to powertrains for automotive vehicles and the like, the powertrain including an engine connected with a transmission for the delivery of power to a drive system. More particularly, the invention relates to bracket means for attachment to the engine and transmission for stiffening the assembly against torsional and bending stresses and vibrations.

BACKGROUND

U.S. Pat. No. 3,207,142 Gorissen et al, assigned to the assignee of the present invention, discloses an arrangement for stiffening a powertrain assembly including an engine, clutch housing and transmission connected in series. The stiffening member comprises a lower cover for the clutch housing having a pair of forwardly extending arms that are secured to the side of the engine block ahead of the clutch housing. This construction is particularly effective in reducing vertical bending of the powertrain between the engine and the clutch transmission assembly so as to reduce stresses at the clutch housing—cylinder block interface.

SUMMARY OF THE INVENTION

The present invention provides a stiffening bracket secured to an engine—transmission assembly (possibly including a clutch housing) to stiffen the assembly against both lateral and vertical bending as well as torsional bending of the cylinder block and connected components. The stiffening bracket is particularly intended for use with both automatic and manual transmission powertrains. The transmission case or housing may be attached directly to the end of the engine cylinder block or may have a separate clutch housing or drive chain case mounted between the engine and transmission.

The bracket is made with variably angled diagonal ribs which extend beneath a portion of the engine oil pan to connect the cylinder block pan side rails with one another and with attachment points on the front face of the transmission case. Any suitable material may be used for the bracket but, where the assembly includes an aluminum engine block and aluminum transmission case, an aluminum material may be selected as appropriate for its light weight and compatible coefficient of thermal expansion.

BRIEF DRAWING DESCRIPTION

In the drawings:

FIG. 1 is a pictorial view of a powertrain comprising an engine-transmission assembly including a stiffening bracket according to the invention;

FIG. 2 is partial side view of the assembly showing the positioning of the bracket; and FIG. 3 is a bottom view of the assembly.

DETAILED DESCRIPTION

Referring now to the drawings in detail, numeral 10 generally indicates a powertrain for an automotive vehicle such as an automobile. Powertrain 10 comprises an assembly of an engine 11, a transmission 12 and a stiffening bracket 14. The bracket 14 is configured and mounted in the assembly so as to reduce torsional and bending deflections and vibrations and their resultant noise and/or stresses on the components of the assembly.

The engine 11 includes an engine block or cylinder block 15 having side walls 16 and end walls 18. The walls 16, 18 have thickened portions along the bottom edges comprising pan rails 19 with machined lower surfaces to which an oil pan 20 is secured in a conventional manner. The engine block is preferably cast of aluminum for light weight. The oil pan is preferably of drawn sheet steel as is common in automotive applications. Other materials and means of forming might be selected for the components if desired.

The engine block also has a rear flange defining a flywheel housing 22 on the rear end wall 18 on which the housing or case 23 of the transmission is securely mounted. The transmission case 23 includes either a clutch housing or a torque converter housing 24, depending upon whether an automatic or manual transmission is provided. A portion of the converter housing 24 (or clutch housing) extends below the oil pan rails of the engine and is enclosed forwardly by a cover 26 bolted to the housing 24 to enclose the lower portion of the engine flywheel and clutch, or converter, not shown. The transmission case 23 is preferably made of cast aluminum for light weight and the cover 26 may be of stamped or cast construction.

In operation of the engine, the block side walls 16 which are connected to the sheet metal oil pan 20 and the lower portion of the converter housing 24 having an attached cover 26 are relatively free to flex and are subject to torsional and bending forces that may cause deflection and vibration with accompanying stresses. To limit these strains and stresses, the powertrain assembly is provided with the stiffening bracket 14.

The bracket 14 is preferably made of cast aluminum although other materials and means of forming could be used. It includes a body 27 having six bosses 28, 30 31, 32, 34, 35. The body 27 has four corner regions where the bosses are located. Boss 28 at the left rear and boss 30 at the right rear extend rearwardly and have longitudinal openings 36. Bosses 31 and 32 are longitudinally aligned at the right front. Bosses 34 and 35 are longitudinally aligned at the left front and all four extend upwardly and have vertical openings 38.

The body 27 includes a generally horizontal floor 39 which dips downwardly toward the longitudinal center to extend under a shallow rearward portion 40 of the engine oil pan. The floor 39 interconnects the bosses and slopes upwardly from the rear bosses 28, 30 to the front bosses 31, 32, 34, 35. The forward portion of the floor is cut away between the forward bosses 32 and 35 to pass around the rear of the deep oil sump portion 42 of the oil pan.

Pairs of ribs extending downwardly from the floor interconnect the front and rear corner regions to stiffen the floor and absorb the vertical bending and torsional twisting forces. Ribs 43, 44 extend approximately parallel in a generally lengthwise direction along the left side of the floor 39 and connect opposite sides of boss 28 with boss 34 and boss 35, respectively. Ribs 46, 47 extend similarly along the right side and connect opposite sides of boss 30 with bosses 31 and 32, respectively.

Ribs 48, 50 extend generally parallel and diagonally across the floor from opposite sides of the left rear boss 28 to the aft and forward right front bosses 31, 32, respectively. Ribs 51, 52 extend generally parallel and diagonally from opposite sides of the right rear boss 30 to the aft and forward left front bosses 34, 35, respectively. Ribs 44 and 52 actually intersect near the rear left corner of the oil sump and run together to connect with boss 35. An additional rib 54 interconnects diagonal ribs 50 and 52 along the rear of the oil sump which angles diagonally back toward the right side to clear a related component, not shown. A pair of additional bosses 49, 53 are provided in the right front corner region for mounting an unrelated accessory.

In assembly, screw fasteners 55 engage threaded openings 56 to secure the bosses 28, 30 to mating bosses 58, 59 on the front of the converter housing 24. Additional fasteners 55 engage threaded openings 60 in the right and left pan rails 19 to secure bosses 31, 32 to the right pan rail and bosses 34, 35 to the left pan rail. The cylinder block side walls intermediate their ends are thereby connected to one another and to the converter housing front face and the assembly is stiffened against torsional and bending forces both lateral and vertical through the ribbed bracket. The ribbed construction absorbs these forces while maintaining a lightweight construction that adds relatively little weight to the powertrain.

While the invention has been described by reference to a preferred embodiment, it should be understood that numerous changes could be made in the form and construction of the powertrain and associated stiffening bracket including the materials and methods of manufacturing thereof. These details are disclosed as examples only and not to limit the following claims which are to be given full scope permitted by their terms and the accompanying description.

We claim:

1. A powertrain assembly comprising
   an engine block having spaced parallel side walls and an end wall,
   closure means connected to lower portions of the side walls to close the space between them and maintain lubricant therein,
   power output mean shaving a housing secured to the engine block end wall and extending below the block side walls, and
   a stiffening bracket extending beneath the closure means and connecting portions of the side walls intermediate their ends with one another and with a lower portion of the output means housing to reduce bending and torsional stresses in the assembly.

2. A powertrain assembly as in claim 1 wherein said bracket has spaced connecting means at four spaced corner portions, two adjacent ones of said corner portions being secured one to each of said side walls and the other adjacent pair of said corner portions being secured to said output means housing.

3. A powertrain assembly comprising
   an engine block having spaced parallel side walls and an end wall,
   closure means connected to lower portions of the side walls to close the space between them and maintain lubricant therein,
   power output means having a housing secured to the engine block end wall and extending below the block side walls, and
   a stiffening bracket connecting with portions of the side walls intermediate their end sand with a lower portion of the output means housing to interconnect said portions and reduce bending and torsional stresses in the assembly, said bracket having four spaced corner portions and connecting means at each of said corner portions, two adjacent ones of said corner portions being secured one to each of said side walls and the other adjacent pair of said corner portions being secured to said output means housing, said bracket further having a floor interconnecting the four corner portions and ribs integral wit the floor and connecting each of the housing-connected corner portions with each of the sidewall-connected corner portions.

4. A powertrain assembly as in claim 3 wherein said bracket has pairs of ribs extending from each of said housing connected corner portions toward each of said sidewall-connected corner portions, said ribs including generally longitudinally and generally diagonally extending pairs.

5. A powertrain assembly as in claim 3 wherein said bracket floor extends between the side walls below the closure means.

6. A stiffening bracket for use in a powertrain assembly, said bracket comprising
   a floor having four spaced corner portions including one adjacent pair thereof,
   securing means at each of said corner portions, and
   a plurality of ribs integral with said floor, and extending between said adjacent pair and the other two of said corner portions.

7. A stiffening bracket as in claim 6 wherein said ribs include generally longitudinal ribs extending from each one of said adjacent pair of corner portions to another adjacent corner portion and diagonal ribs extending from each one of said adjacent pair of corner portions to a diagonally opposite one of said corner portions.

8. A stiffening bracket as in claim 7 wherein each of said pair of adjacent corner portions has a mounting boss and each of the other corner portions has a pair of mounting bosses, and said ribs include pairs of generally longitudinal ribs extending from opposite sides of the bosses of each adjacent pair of corner portions to the bosses of the other corner portions.

* * * * *